Jan. 5, 1965     D. H. HUGHES ETAL     3,164,182
MACHINE FOR STEM-CUTTING AND SIZING OF MUSHROOMS
Filed Oct. 26, 1960     3 Sheets-Sheet 1

INVENTOR
DONALD H. HUGHES
WILLIAM E. LARSON

BY Herbert M. Birch
ATTORNEY

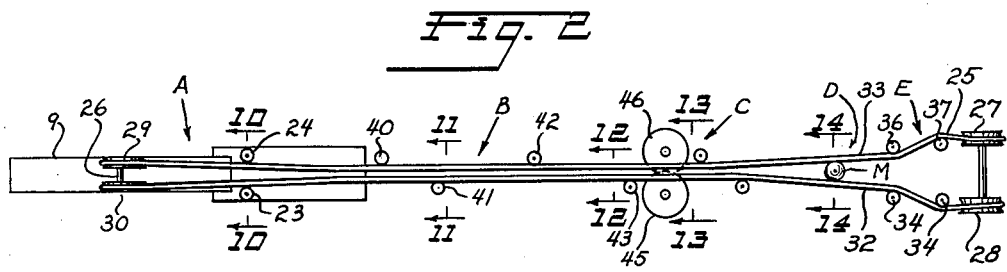
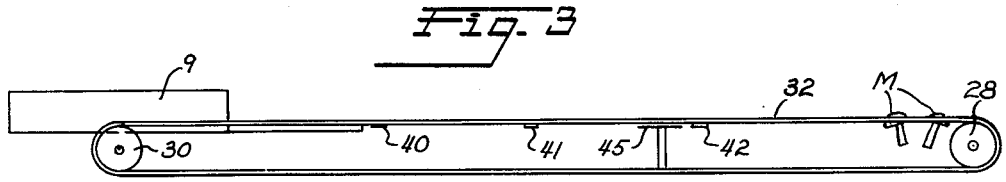
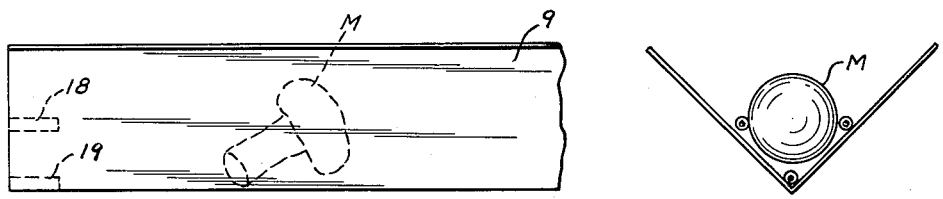
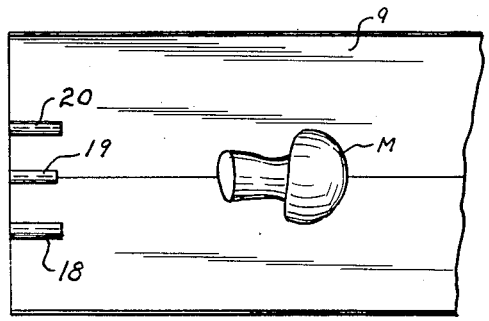
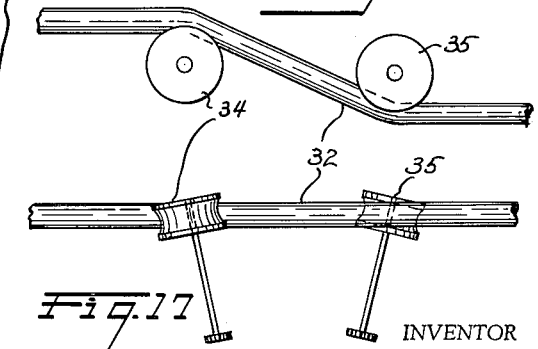
INVENTOR
DONALD H. HUGHES
WILLIAM E. LARSON
BY 
ATTORNEY

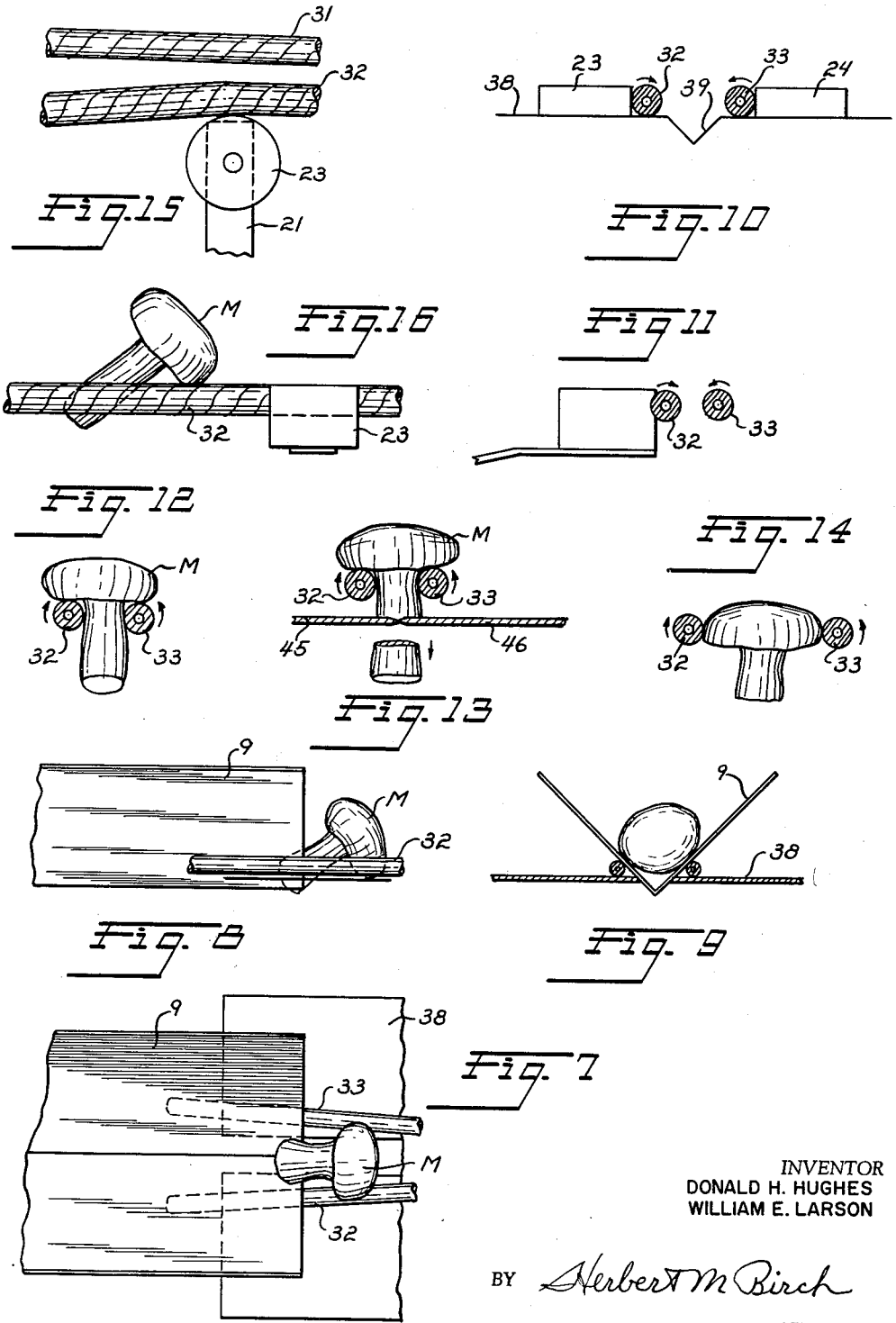

United States Patent Office 3,164,182
Patented Jan. 5, 1965

3,164,182
MACHINE FOR STEM-CUTTING AND SIZING
OF MUSHROOMS
Donald H. Hughes, Newark, Del., and William E. Larsen,
Tucson, Ariz., assignors to The American Mushroom
Institute, Kennett Square, Pa., a non-profit association
Filed Oct. 26, 1960, Ser. No. 65,880
3 Claims. (Cl. 146—81)

The present invention relates to mushroom processing equipment and more particularly to a machine for aligning, feeding, stem-cutting and sizing of mushrooms.

Generally, mushrooms after maturity consist of a cap, gills under the cap, a stem and roots at the stem extremity. In harvesting the mushrooms, the most satisfactory process is to pull the same with the roots intact from the growing beds. Prior machines have been devised to process mushrooms, but these prior art machines are hand-fed and such hand-fed machines have their speed and efficiency limited by that of the operator.

It is an object of this invention to provide novel mushroom processing equipment, whereby the mushrooms are mechanically fed to the equipment, which positions, cuts the roots from the stems, and, if desired, the stems from the caps; separates the roots, stems, and caps and finally sorts the same according to particular cap diameter size.

Another object is to provide novel means for gently manipulating the mushrooms, whereby bruise injury is prevented.

With these and other objects in view, which will become apparent as the invention is fully understood, the same resides in the novelty of construction, combination and arrangement of elements hereinafter described in detail and distinctly summarized in the appended claims.

The description should be read in conjunction with the accompanying drawings, wherein FIGURE 1 is a top perspective view of the assembled invention as viewed from the forward end to rear of the machine;

FIGURE 2 is a top plan view of the feed mechanism of the machine per se;

FIGURE 3 is a side view of the feed mechanism shown in FIGURE 2;

FIGURE 4 is a side view of the V-guide of the machine with the feed jets for the mushrooms which generally may be termed station A for positioning the mushrooms for reception by the feed belts;

FIGURE 5 is an end view taken from the discharge end of the V-guide of FIGURE 4 and showing a mushroom cap and the feed jets therein for feeding the mushrooms to the feed belts;

FIGURE 6 is a partial top plan view of the V-guide;

FIGURE 7 is a top view of the discharge end of the V-guide or trough, the feed belts about to feed a mushroom forward of the machine over the flat belt guides at the starting end thereof;

FIGURE 8 is a side view of the elements of FIGURE 7;

FIGURE 9 is an end elevation view of the V-guide discharge end with the feed belts and their respective flat supports in transverse section;

FIGURE 10 is a section view taken on the line 10—10 of FIGURE 2;

FIGURE 11 is a section view taken on the line 11—11 of FIGURE 2;

FIGURE 12 is a section view taken on the line 12—12 of FIGURE 2;

FIGURE 13 is a section view taken on the line 13—13 of FIGURE 2;

FIGURE 14 is a section view taken on the line 14—14 of FIGURE 2;

FIGURE 15 is a top plan view of a portion of the feed belts and one of the alternately staggered guide rollers;

FIGURE 16 is a side view of the arrangement illustrated in FIGURE 15;

FIGURE 17 is a side view of the sheave mounting and position to provide the auger action to the feed belts, and FIGURE 18 is a top plan view thereof showing the angular mounting thereof in their respective idler shafts.

Figure 1:
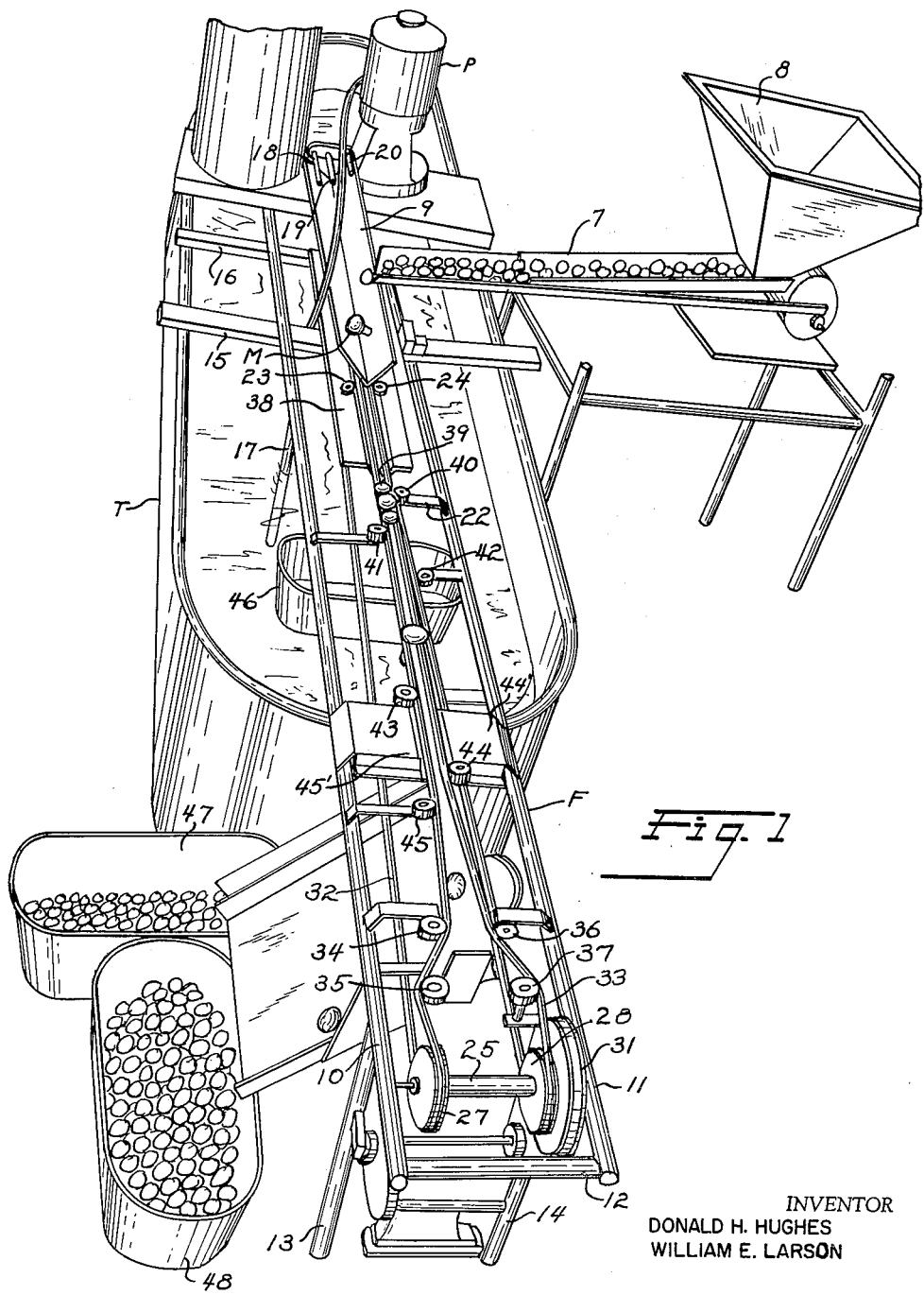

Referring to the drawings and first with particular reference to the top and side views of the machine in FIGURES 1, 2 and 3, the mushrooms are mechanically fed by a suitable means, such as a vibratory feed line 7 from a feed hopper 8 into a V-guide or trough 9. This guide 9 tends to position the mushrooms M with the stem in alignment with the main axis of the machine defined by the frame structure F. This frame F comprises elongated side bars 10 and 11 oppositely spaced apart by end rods 12, such as shown in FIGURE 1 at the forward end of the machine. The forward end is supported by legs 13 and 14 and the rear end of the frame extends over a vat or tub T and is supported thereon by longitudinally spaced cross braces 15 and 16.

The tub T in addition to serving as a rear support for the frame also supports a suitable pump P, which pumps water from the tub by tube 17 for discharge from a plurality of feed jets 18, 19 and 20 positioned adjacent the two sides and apex of the V-shaped trough or guide 9.

The oppositely positioned side frame bars 10 and 11 are provided at predetermined intervals with arms 21 and 22 respectively. Mounted on each of their respective arms are guide rollers hereinafter enumerated. The arms 21 and their supported guide rollers are preferably staggered with respect to the arms 22 and their respective guide rollers supported by the said frame bars 10 and 11, see FIGURES 1, 15 and 16. Mounted at each end of the frame F are cross pulley or sheave shafts 25 and 26, see FIGURES 1 and 2, and keyed to these shafts are spaced sheaves 27–28 and 29–30. A main belt driven pulley 31 mounted on the shaft 25 adjacent the sheave 28 serves to impart rotation to the sheaves 27 and 28 around which are reeved the endless belts 32 and 33. Each of these belts 32 and 33 along their respective top or upper reaches are threaded or reeved between alternately aligned and angularly positioned idler pulleys 34 and 35 and 36 and 37, respectively, see FIGURES 1, 17 and 18. As shown each aligned set of pulleys has the belt groove thereof at an angle, whereby the belts must roll to fall into the pulley groove. This turning or auger action of the belts forces the mushrooms to maintain their positions so they do not fall through the feed belts until they reach the proper position.

These belts 32 and 33 are spaced and positioned so as to provide cooperative action at various stations along their respective paths of travel around their respective sheaves. For example, the belts are arranged and spaced with a forward tapering clearance at a pick-up station A. The stems of the mushrooms are picked up at this station by means of oppositely positioned guide means such as rollers 23 and 24. This section of the respective belts 32 and 33 extends forwardly over a flat guide 38 to a V-notch 39, into the apex of which extend the roots and stems of the mushrooms M to be processed. From stem pick-up station A the belts 32 and 33 are repositioned in closer substantially parallel relation as at station B by means of alternately staggered and spaced guide means, such as rollers 40, 41, 42, 43, 44 and 45, to station C consisting of the stem cutting knives 44' and 45'. Prior to the station C is a bin 46 for collecting extremely small mushrooms that fall between the plastic belts.

From stem cutter station C the belts are permitted by the alternately spaced guides 44 and 45 to gradually diverge from each other in the provision of a sizing station D, whereby the mushrooms after the stems are cut may be separated into collecting bins 47 and 48 according to the cap size of the respective mushrooms being processed, see FIGURES 1 and 2.

The feeding belts 32 and 33 are preferably round or tubular and at station E are each fed into spaced angularly mounted idler sheaves 34-35 and 36-37, respectively. These respective pairs of idler sheaves or pulleys cause the belts to roll to fall into the angularly arranged grooves of each pair of the said sheaves, in a direction toward each other, thereby forcing the mushrooms to maintain their positions so that they do not fall through the belt members until they reach the proper drop-out point, see the directional arrows in FIGURE 10.

At the loading end of the machine are positioned the said high velocity water jets 18, 19 and 20. These jets as previously stated are directed along the sides of the V-guide 9, with jet 19 being directed along the apex of the guide. In action the jets move the mushrooms along the guide into the pick-up station A between the feed belts 32 and 33, and the water from these jets from start to finish provides a frictionless cushion for the mushrooms to travel on and aids in reducing bruise injury.

Also, each respective belt guide preferably is mounted on an eccentric pin to permit adjustment of the distance between belts for processing different size mushrooms, see FIGURE 10.

*Machine Operation*

In the operation of the hereinbefore described machine, the mushrooms are mechanically fed by the vibratory trough 7 from the machine hopper 8. This trough is V-shaped and tends to push the stem of each mushroom downward and directs it to the V-shaped feed trough 9, which trough at the rear portion thereof houses the feed jets 18, 19 and 20; then the pump P is started and the high velocity jets of water are directed along the sides of the V-guide, thereby completing the alignment and moving the mushrooms forward between the round plastic belts 32 and 33.

As illustrated by the directional arrows of FIGURE 10 of the drawings, each belt is turned in a direction toward each other, whereby the stems of the mushrooms are pulled downwardly between the belts as the same are fed forward through the machine. As the mushrooms are fed forward, the flexible belts open up to accommodate most sizes, while at the same time they hold the mushrooms gently, and firmly, for passage through the cutting knife station C, see FIGURE 2. From start to finish the water accumulated from the jet feeding means provides a frictionless cushion for the mushrooms to travel on and aids in reducing bruise injury.

The several guides for the belts are preferably adjustable with respect to each other for different size mushrooms and after the passage through the cutting station, means to grade the mushrooms out at this point by dropping them from between the belts into collecting bins is provided by regulating the said guides and the distance between the belts. This grading step is desirable whether the end product is to be fresh packed or canned.

After the cutting and sizing steps have been completed, the belts each feed over a pair of angularly spaced sheaves; and it is this feeding action that results in the rolling of the belts toward each other to provide for a downward pull on the stems of the mushrooms.

Usually the machine is constructed to perform at a predetermined belt speed, for example, one hundred feet per minute and the mushrooms are arranged to be engaged by the belts at approximately two inch intervals. This arrangement produces a capacity, with the average size mushroom of about one thousand pounds per hour.

Thus with the present machine it is to be noted that one operator is able to feed the mushrooms to more than one machine at a time and as a result the cutting, sizing and separating of the mushrooms is greatly facilitated and many times as rapid as heretofore possible with prior art hand-fed machines.

While only one complete embodiment of the present invention is described and illustrated, it is to be expressly understood that other arrangements of the present invention may be developed by those skilled in the art after they have studied the present invention. For a definition of the limits of the present invention, reference should be had to the appended claims.

What is claimed is:

1. A machine for processing mushrooms harvested with roots intact from growing beds, comprising a feed hopper and a vibratory discharge chute leading from said hopper, a mushroom collector trough formed to position the collected mushrooms with the stems downward, high velocity fluid feed jets positioned at the end of said collector trough for forcing said mushrooms forward from the discharge end of said trough, spaced endless conveyor belts having the starting end of their respective upper reaches mounted below the discharge end of said trough, adjustable guide means spaced along each respective side of each of said members so positioned and so arranged as to permit said mushrooms adjacent the terminal end of the belts to drop from between the said belts according to the size of the mushroom caps, said belts being tubular, and belt rolling means for each of said conveyor belts imparting axial turning of the same in opposite directions downwardly toward each other, to thereby pull downward on the stems of the mushrooms being conveyed.

2. A machine for processing mushrooms harvested with roots intact from growing beds, comprising a feed hopper and a vibratory discharge chute leading from said hopper, a mushroom collector and guide trough formed with a V-shaped configuration to position the collected mushrooms with the stems downward, said collector and guide trough being mounted under the discharge end of said chute, high velocity fluid feed means in an end of the collector and guide trough for forcing said mushrooms forward in the trough to the opposite discharge end thereof, spaced flexible elongated conveyor members having the starting end thereof mounted below the discharge end of said trough spaced adjacent each side of the apex thereof, said members thereby being positioned to receive the stem portions of said mushrooms discharged from the collector and guide trough, thereby permitting the caps of the mushrooms carried by the stems to straddle the same, an elongated rectangular frame longitudinal of the machine having a side bar adjacent each conveyor member, and conveyor guide member means mounted on each respective side bar of the said frame, said guide means being mounted on arms of different relative lengths secured to each of said side frame bars to vary the distance between said conveyor members, thereby permitting said mushrooms adjacent the terminal end of the members to drop progressively from between said members according to the size of their respective caps into spaced sorting bins.

3. A machine for processing mushrooms harvested with the roots intact from growing beds, as described in claim 2, wherein said flexible elongated conveyor members are spaced endless belt members of tubular plastic, and belt rolling means for each of said belt members imparting axial turning of the same in opposite directions downwardly toward each other, to thereby pull downward on the stems of the mushrooms being conveyed to the said sorting bins.

References Cited by the Examiner

UNITED STATES PATENTS

| | | | |
|---|---|---|---|
| 1,266,668 | 5/18 | Drew | 198—33 |
| 1,299,233 | 4/19 | Royer | 146—83 |
| 2,178,920 | 11/39 | Savery | 146—230 |
| 2,245,913 | 6/41 | Gridley et al. | 198—33 |
| 2,292,068 | 8/42 | Grayson | 209—102 X |
| 2,625,781 | 1/53 | Tateyama. | |
| 2,811,997 | 11/57 | Schmidt et al. | 146—241 |
| 2,837,131 | 6/58 | Fried | 146—81 |
| 2,854,083 | 9/58 | Wetzel. | |
| 2,978,003 | 4/61 | Benekam | 146—81 |
| 3,002,618 | 10/61 | Derderian et al. | 209—102 |

J. SPENCER OVERHOLSER, *Primary Examiner.*

CARL W. ROBINSON, LOUIS J. CAPOZI, *Examiners.*